(12) United States Patent
Gablonski et al.

(10) Patent No.: US 9,528,607 B2
(45) Date of Patent: Dec. 27, 2016

(54) STUFFING BOX FLOW DIVERTER AND METHODS THEREFOR

(75) Inventors: Ben Gablonski, Hornsby (AU); Perry Willis, Caringbah (AU)

(73) Assignee: GARLOCK SEALING TECHNOLOGIES, LLC, Palmyra, NY (US)

( * ) Notice: Subject to any disclaimer, the term of this patent is extended or adjusted under 35 U.S.C. 154(b) by 1084 days.

(21) Appl. No.: 13/309,119

(22) Filed: Dec. 1, 2011

(65) Prior Publication Data

US 2013/0139888 A1 Jun. 6, 2013

(51) Int. Cl.
*F16J 15/18* (2006.01)
*F16L 41/02* (2006.01)
*F17D 1/00* (2006.01)

(52) U.S. Cl.
CPC ........... *F16J 15/182* (2013.01); *F16J 15/183* (2013.01); *F16L 41/021* (2013.01); *F17D 1/00* (2013.01); *Y10T 137/0318* (2015.04)

(58) Field of Classification Search
CPC .......... F16J 15/182; F16J 15/183; F17D 1/00; F16L 39/005; F16L 41/02; F16L 41/021; F16L 41/025
USPC .................. 285/133.11, 133.4, 133.5, 133.6
See application file for complete search history.

(56) References Cited

U.S. PATENT DOCUMENTS

| | | | | |
|---|---|---|---|---|
| 2,029,325 A | * | 2/1936 | Kocher | 285/341 |
| 2,034,553 A | * | 3/1936 | Askin | 165/154 |
| 2,410,912 A | * | 11/1946 | Wenk | 285/123.3 |
| 2,641,491 A | * | 6/1953 | Mueller et al. | 285/15 |
| 4,277,229 A | * | 7/1981 | Pacht | F04B 49/10 417/454 |
| 4,328,973 A | | 5/1982 | Delbridge | |
| 5,056,831 A | * | 10/1991 | Ho | 285/93 |
| 5,105,843 A | * | 4/1992 | Condron et al. | 137/13 |
| 5,137,553 A | * | 8/1992 | Dawes | B01D 59/18 285/133.11 |
| 5,305,854 A | | 4/1994 | Wheeler | |
| 5,772,396 A | | 6/1998 | Rockwood | |
| 5,927,762 A | * | 7/1999 | Webb | 285/123.15 |

(Continued)

OTHER PUBLICATIONS

International Searching Authority, Notification of Transmittal of the International Search Report and the Written Opinion of the International Searching Authority, or the Declaration, Nov. 23, 2012, (PCT/US2012/032904).

*Primary Examiner* — James Hewitt
(74) *Attorney, Agent, or Firm* — Perkins Coie LLP

(57) ABSTRACT

A stuffing box flow diverter including a body including first, second, and third connector portions. The third connector portion is configured for connection to a stuffing box. A first passage extends from the first connector portion to the third connector portion and a second passage extends from the first connector portion to the third connector portion. The first and second passages are coaxial, wherein the second passage includes an annular portion extending along at least a portion of the first passage. The first passage is defined by a tube extending from the first connector portion and through a bore formed in the third connector portion, the bore having a bore diameter larger than an outer diameter of the tube. The second passage includes the annular region defined by the bore diameter and the outer tube diameter.

8 Claims, 3 Drawing Sheets

(56) References Cited

U.S. PATENT DOCUMENTS

| | | | |
|---|---|---|---|
| 5,931,184 A * | 8/1999 | Armenia | F16L 39/005 |
| | | | 137/312 |
| 5,992,904 A * | 11/1999 | Hitachi et al. | 285/332 |
| 6,138,585 A * | 10/2000 | Racine | F23J 1/00 |
| | | | 110/169 |
| 6,834,862 B2 | 12/2004 | Wilkinson | |
| 2010/0011557 A1* | 1/2010 | Hopper et al. | 29/428 |

* cited by examiner

STUFFING BOX FLOW DIVERTER AND METHODS THEREFOR

BACKGROUND

Industrial pumps often use a stuffing box arrangement to control leakage from the pump. A flush system provides flush water to the stuffing box to maintain stuffing box pressure and to provide cooling and lubrication of the compression packing Existing systems typically inject flush water into the stuffing box under pressure via a single port. Traditional systems inject a large quantity of flush water that sometimes excessively dilutes the product being pumped. In many processes this flush water must be removed later at additional expense and impact on the environment.

Accordingly, there is a need for methods and devices that allow flush systems to operate with significantly reduced flush water and without diluting the pumped product, while still maintaining the proper stuffing box pressure to minimize ingress of product from the impellor side of the pump.

SUMMARY

Described herein is a stuffing box flow diverter that comprises a body including first, second, and third connector portions. The third connector portion is configured for connection to a stuffing box. A first passage extends from the first connector portion to the third connector portion and a second passage extends from the first connector portion to the third connector portion. Fluid flow may be provided to the stuffing box through the first passage and received through the second passage, whereby the fluid is provided and received through the same stuffing box port. In an embodiment, the first and second passages are coaxial. Furthermore, the second passage may include an annular portion extending along at least a portion of the first passage. In an another embodiment, the first passage is defined by a tube extending from the first connector portion and through a bore formed in the third connector portion, the bore having a bore diameter larger than an outer tube diameter of the tube. The second passage includes the annular region defined by the bore diameter and the outer tube diameter. The tube may extend beyond the third connector portion and the length of the tube may be adjusted to suit the particular application. The flow diverter may also include a flow limiter connected to the second passage. The third connector portion may include male pipe threads while the first and second connector portions include tube fittings.

In yet another embodiment a stuffing box flow diverter comprises a fitting including an elongate passage extending therethrough. An elongate tube is disposed in the passage, wherein at least a portion of the passage has a diameter greater than an outside diameter of the tube. A lateral passage is formed in the fitting and intersects an annular region between the diameter of the passage and the outside diameter of the tube. In an embodiment, the tube is pressed into the passage and the tube may include a flared portion that engages a sidewall of the passage.

Also contemplated are methods of providing flush fluid to a stuffing box. In an embodiment, the method comprises providing fluid to a stuffing box port, circulating at least a portion of the fluid in the stuffing box, and receiving the fluid from the same stuffing box port. In another embodiment, the method may further comprise limiting the flow rate of the fluid received, which may be accomplished with a flow control valve. In an embodiment, the fluid is provided through the port by a tube and the fluid is received through the port by an annulus surrounding the tube.

These and other aspects of the flow diverter and methods therefor will be apparent after consideration of the Detailed Description and Figures herein.

DRAWINGS

Non-limiting and non-exhaustive embodiments of the flow diverter, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
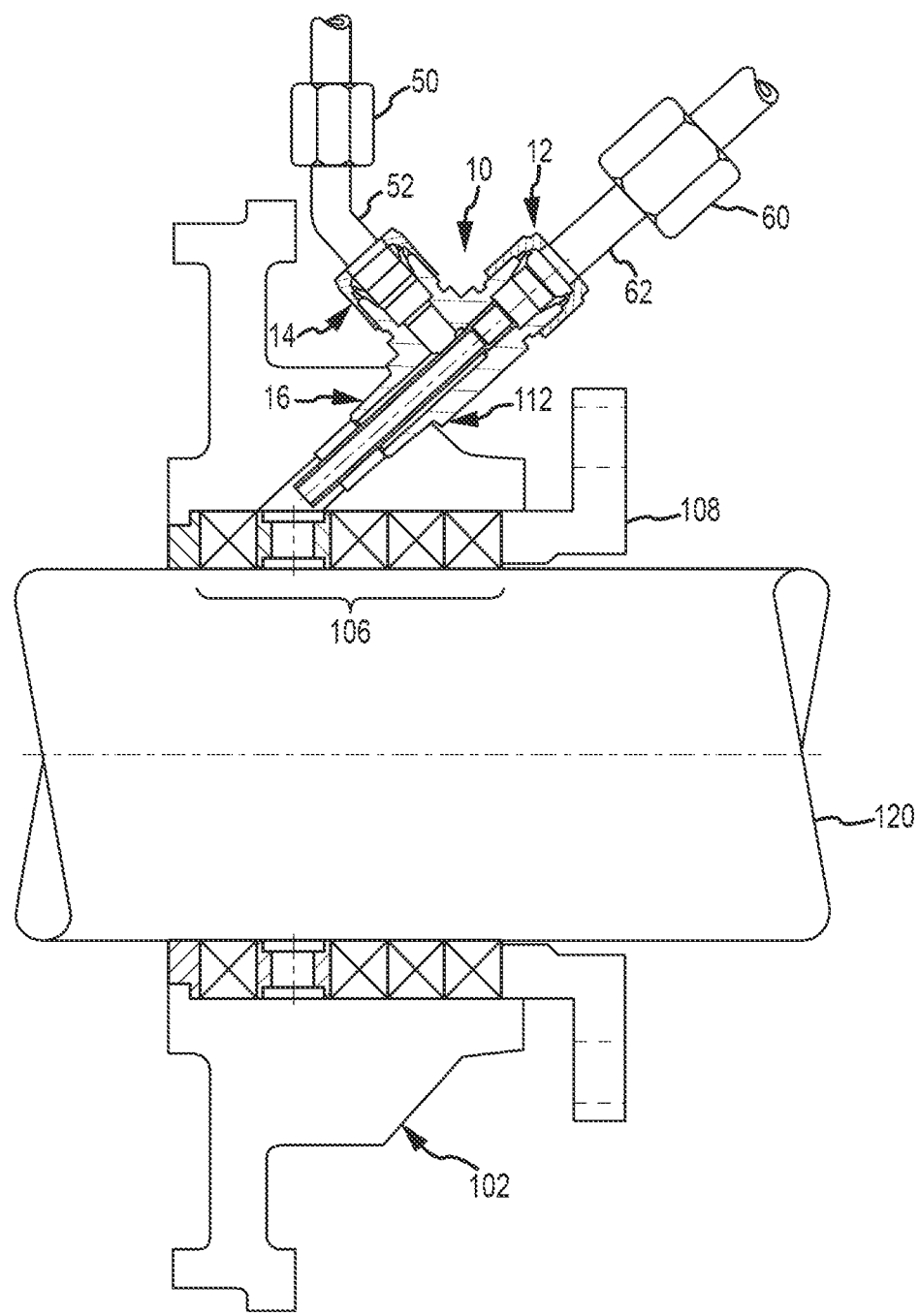
FIG. 1 is a cross-sectional side view in elevation of a stuffing box fitted with an exemplary embodiment of a flow diverter.

FIG. 1 illustrates a stuffing box arrangement fitted with a flow diverter 10 according to an exemplary embodiment. Stuffing box 102 is attached to a pump housing flange as is well known in the art. The stuffing box 102 houses packing 106 which is retained in the stuffing box 102 by packing follower 108. The packing 106 provides a seal between the stuffing box 102 and pump shaft 120. Stuffing box 102 includes port 112 through which flush fluid may be circulated.

Figure 2:
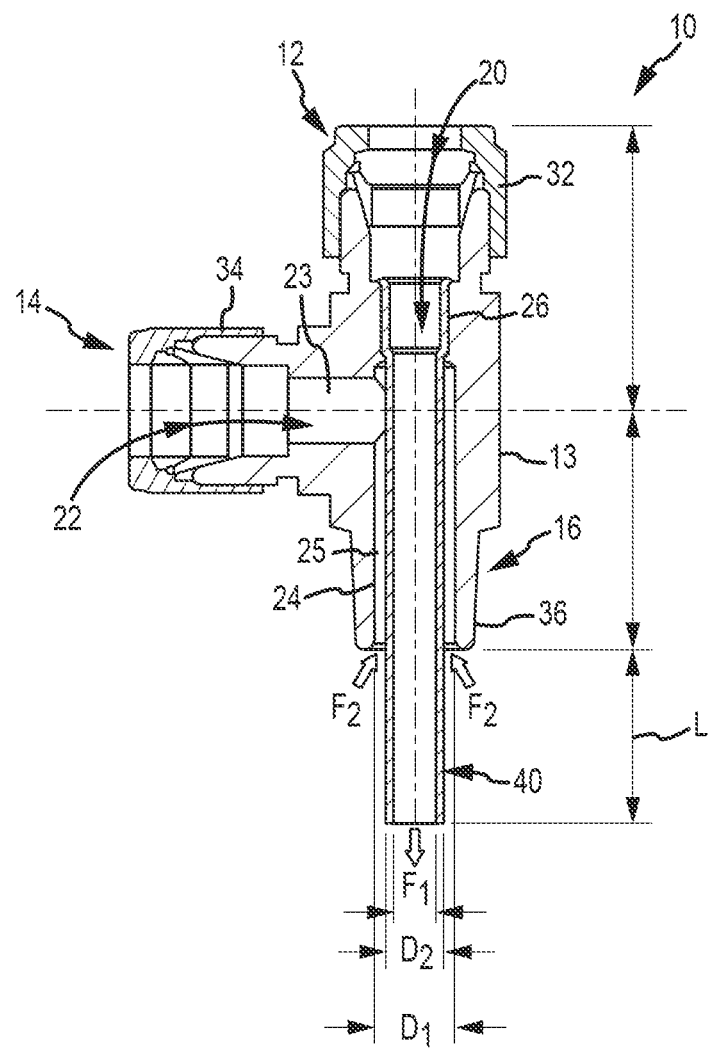
FIG. 2 is a cross-sectional side view in elevation of the flow diverter shown in FIG. 1.

In traditional stuffing box arrangements, flush fluid enters the stuffing box via a port, such as port 112, and remains in the stuffing box or eventually migrates through the packing 106 and into the product being pumped. However, in this case, flush fluid circulates by entering and exiting the stuffing box 102 through port 112. This is accomplished by the flow diverter 10. With reference to FIG. 2, flow diverter 10 includes a fitting body 13 having a first connector portion 12, a second connector portion 14, and a third connector portion 16. In this case, the first and second connector portions (12, 14) include tube fittings 32 and 34, respectively. Tube fittings 32, 34 connect to tubing that ultimately connects to a barrier tank (not shown) that contains flush fluid. Third connector portion 16 includes male pipe threads 36, which threadably mate with port 112 of stuffing box 102. While the flow diverter 10 is shown here with particular connector/fitting styles other fluid connectors as are known in the art may be used.

A first flow passage 20 extends from first connector portion 12 to third connector portion 16. A second passage 22 extends from second connector portion 14 to third connector portion 16. In this case, first passage 20 is an elongate passage defined by a tube 40. Tube 40 extends from the first connector portion and through a bore 24 that is formed in the third connector portion 16. As shown in the figure, bore 24 has a diameter D1 which is greater than the outer diameter D2 of tube 40. The second passage 22 includes a lateral portion 23 connected to the annular region 25 that is defined by diameter D1 of bore 24 and the outer diameter D2 of tube 40. Therefore, the first and second passages are coaxial in that the second passage includes an annular portion that extends along at least a portion of the first passage. In an embodiment, the area of the annular region 25 is larger than the area of the first flow passage 20.

Figure 3:
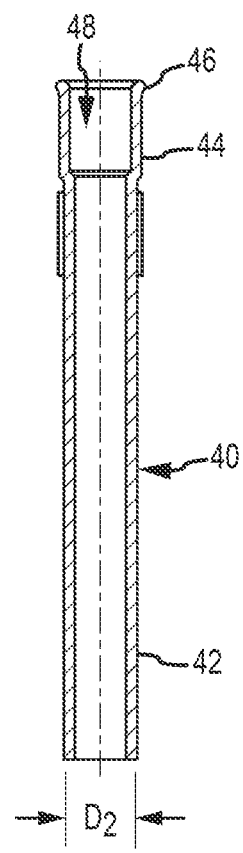
FIG. 3 is a cross-sectional side view in elevation of the flow tube shown in FIG. 2.

With further reference to FIG. 3, it can be appreciated that tube 40 may be pressed into fitting body 13. Tube 40 includes a first portion 42 of a diameter D2 and a second end portion 44 which is expanded to facilitate pressing the tube into the fitting 13. Furthermore, the expanded region 44 may include a flare 46. Tube 40 has an interior 48 which acts as the first passage 20. Alternatively, tube 40 may be secured in fitting body 13 with, for example and without limitation, threads, adhesive, welding, and the like. Returning to FIG. 2, tube 40 extends beyond the third connector portion 16 a distance L. The distance L may be adjusted by, for example, cutting the length of tube 40 to fit the particular application. Distance L is selected based on the dimensions of the stuffing box 102. For example, as shown in FIG. 1, distance L is selected such that tube 40 discharges incoming flush fluid near packing 106 without interfering with the packing.

In this case, flow diverter 10 comprises a tee fitting, such as a Let-Loc male run tee model number 771L-⅜×¼ available from Ham-Let, that has been modified with a bore having a diameter D1 as shown in FIG. 2. Also, the standard tee has been modified by pressing tube 40 into the fitting. While the flow diverter 10 has been shown in the figures as a modified tee fitting with a tube pressed therein, the flow diverter may be formed of a single piece of material that has been, for example, machined with a first passage 20 and a second passageway 22 including an annulus 25 which extends around and along at least a portion of the first passageway 20. Flow diverter 10 may be formed of any suitable material such as steel, stainless steel, aluminum, brass, and the like. Furthermore, the flow diverter may be comprised of suitable plastics such as ABS, Delrin, and the like. Moreover, combinations of materials such as a steel tee fitting which includes a plastic tube, or vice versa are contemplated.

The flow diverter may also include a flow rate limiter as are known in the art. For example, flow diverter 10 may include a flow control valve 50 as shown in FIG. 1. The flow control valve 50 controls the stuffing box pressure by regulating the amount of flush fluid exiting stuffing box 102. In this case, the flow control is connected via tubing 52 to second connector portion 14. A suitable flow control valve is the 15 mm Body Flow Control Valve produced by Maric Flow Control of Australia.

Furthermore, the flow diverter may also include a check valve as are known in the art. For example, flow diverter 10 may include a check valve 60 as shown in FIG. 1. The check valve 60 prevents the return of flush fluid through the inlet in the event the stuffing box pressure increases from a surge in pump pressure, for example. Accordingly, the check valve is oriented to allow flow into the stuffing box through first passage 20 but prevent flow in the reverse direction. In this case, the check valve 60 is connected via tubing 62 to first connector portion 12.

In use, flush fluid enters the stuffing box via passage 20 and tube 40 as indicated by arrow F1 and returns as indicated by arrows F2 through annular region 25 (see FIG. 2). Thus, flush fluid is both provided and received through the same stuffing box port. When flush fluid flows in this manner first flow passage 20 may be characterized as an inlet, while second flow passage 22 may be characterized as an outlet. Alternatively, flow through diverter 10 may be reversed by switching the location of the flow control valve 50 and the check valve 60. In this case the first flow passage 20 may be characterized as an outlet, while second flow passage 22 may be characterized as an inlet.

Also contemplated herein are methods of providing flush fluid to a stuffing box. The methods thus encompass the steps inherent in the above described structures and operation thereof. Broadly, one method may include providing fluid to a stuffing box port and circulating at least a portion of the fluid in the stuffing box and then receiving the fluid from the same stuffing box port. The method may also include limiting the flow rate of the fluid received (i.e. through the outlet), which may be accomplished with a flow-limiting valve as described above. The method may also include inhibiting fluid from returning through the inlet which may be accomplished with a check valve.

Although the technology and methods of using and/or applying the same have been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A stuffing box arrangement comprising:
 a stuffing box comprising a first port;
 a flow diverter, comprising:
  a body including first, second, and third connector portions, wherein the third connector portion is in fluid connection with the first port of the stuffing box;
  a first passage extending from the first connector portion to the third connector portion;
  a second passage extending from the second connector portion to the third connector portion;
  the second passage including an annular portion extending along at least a portion of the first passage; and
  the first passage defined by a tube extending from the first connector portion, through a bore formed in the third connector portion, the bore having a bore diameter larger than an outer tube diameter of the tube, and wherein the second passage includes an annular region defined by the bore diameter and the outer tube diameter;

the tube including a first terminal end portion positioned beyond, but adjacent to, the third connector portion, and a second terminal end portion opposite the first terminal end portion positioned within the flow diverter and proximate the first connector portion.

2. The flow diverter of claim 1, wherein the first passage and the annular portion of the second passage are coaxial.

3. The flow diverter of claim 1, further comprising a flow limiter connected to the second passage at a position exterior to the flow diverter.

4. The flow diverter of claim 1, wherein the third connector portion includes male pipe threads.

5. The flow diverter of claim 4, wherein the first and second connector portions include tube fittings.

6. The flow diverter of claim 1, wherein the tube is pressed into the first passage.

7. The flow diverter of claim 6, wherein the second terminal end portion of the tube includes a flared portion engaging an interior sidewall of the first passage.

8. The flow diverter of claim 1, further comprising a flow limiter connected to the second passage.

\* \* \* \* \*